E. B. ALLEN.
STITCH FORMING MECHANISM.
APPLICATION FILED NOV. 2, 1910.

1,030,046.

Patented June 18, 1912.

Witnesses:
W. P. Stewart

Inventor
Edward B. Allen
By his Attorney
Henry J. Miller

E. B. ALLEN.
STITCH FORMING MECHANISM.
APPLICATION FILED NOV. 2, 1910.

1,030,046.

Patented June 18, 1912.

Witnesses:
W. P. Stewart
Géfà Verna

Inventor
Edward B. Allen
By his Attorney
Huey J. Miller

E. B. ALLEN.
STITCH FORMING MECHANISM.
APPLICATION FILED NOV. 2, 1910.

1,030,046.

Patented June 18, 1912.

Witnesses:
W. P. Stewart
Géza Ferna

Inventor
Edward B. Allen,
By his Attorney
Henry J. Miller

E. B. ALLEN.
STITCH FORMING MECHANISM.
APPLICATION FILED NOV. 2, 1910.

1,030,046.

Patented June 18, 1912.

Witnesses:
W. P. Stewart
Géza Verman

Inventor
Edward B. Allen,
By his Attorney
Henry J. Miller

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

STITCH-FORMING MECHANISM.

1,030,046.

Specification of Letters Patent. Patented June 18, 1912.

Application filed November 2, 1910. Serial No. 590,269.

*To all whom it may concern:*

Be it known that I, EDWARD B. ALLEN, a citizen of the United States, residing at Bridgeport, in the county of Fairfield and State of Connecticut, have invented certain new and useful Improvements in Stitch-Forming Mechanism, of which the following is a specification, reference being had therein to the accompanying drawings.

This invention is designed for embodiment more particularly in that class of overseaming stitch-forming mechanism comprising a laterally jogging needle or rectilinearly reciprocating needles for passing upper-thread loops through the work in different substantially parallel paths and two loopers, one of which carries a lower thread, arranged beneath the work and adapted to coöperate each with the needle in one of its lateral positions or with its respective needle (when two of the latter are employed), in conjunction with loop-spreaders coöperating with said loopers for distending thread loops for passage of thread loops carried by the needle or needles. The improvement is however applicable to other classes of stitch-forming mechanism.

The invention has for its primary object to insure the certainty of coöperation of the lower-thread looper with the needle which presents upper-thread loops for its passage, so as to prevent skipping of stitches, and it has for a further object to insure the disposition of the purl, or interlock of the upper and lower thread, upon the extreme edge of the work where the mechanism is employed for overedge stitching, as in the production of buttonholes.

According to the present improvement, a thread-carrying member passes a loop of lower thread through an initial upper-thread loop presented beneath the work by the needle, which lower-thread loop is engaged and held by an independently movable loop-detainer while the thread-carrying looper recedes, after which the initial upper-thread loop is drawn up around the lower-thread loop while the needle is still above the work preparatory to a succeeding descent, so that said initial upper-thread loop is drawn close to the lower face of the work before the formation of the succeeding upper-thread loop which is passed through said lower-thread loop and distended for seizure by the second looper. By these means, the initial upper-thread loop is drawn up above loop-presenting position previous to the throwing out of the succeeding upper-thread loop, and is entirely removed from interference therewith so as to avoid deflecting it and endangering the missing of the same by the point of the secondary looper. This manner of handling the upper and lower thread loops is particularly important in connection with stitching overlapping plies of material united by a sticky cement, such as the button-hole flies of shoe uppers, or rubber fabrics, as the adherence of particles of rubber or cement to the upper thread in its passage through the work causes to a greater or less extent the stiffening of the same so that the contact of successively formed thread loops beneath the work increases the liability of deflection of the last formed upper-thread loop preparatory to the advance of the looper to seize the same. The difficulty referred to has been obviated to some extent in previous machines, in which the thread-carrying looper and its spreader remain in the initial upper-thread loop for passage of the succeeding upper-thread loop, only by employing an abnormally strong tension upon the upper thread, but as the thread-carrying looper did not in such case recede from the initial upper-thread loop until the eye of the needle had descended below the fabric the drawing of the upper thread to pull up the initial upper-thread loop necessitated the rendering of the thread through the new needle-puncture in the work to the needle-eye and thence upwardly again through the needle-puncture to the take-up mechanism; whereas according to the present improvement, the recession of the thread-carrying looper from the primary upper-thread loop immediately after reaching advance position permits the drawing up of the initial upper-thread loop around the lower-thread loop while the needle is elevated and before its point enters the work in the succeeding descent, so that the object referred to is effected in accordance with the present invention with a normal upper-thread tension, or one which is entirely suited to the class of overseam to be produced.

From the nature of the present improvement, as above set forth, it will be observed that the same is not limited to any particular type of stitch-forming mechanism, but is applicable to any of such mechanisms for producing plural-thread seams. As herein specifically shown and described, it is equally adapted for embodiment in the stitch-forming mechanism shown and described in connection with my pending application Serial No. 535,340, filed December 28, 1909, or in that of my United States Patent No. 864,144, dated August 27, 1909; but by suitable modification, such as would readily suggest itself to those skilled in the art, it is adapted for the classes of overseaming mechanism comprising a plurality of out-of-time needles in conjunction with a looper for taking thread loops from one needle and presenting thread loops for passage of the other needle.

In the accompanying drawings, Figs. 10 and 11 are enlarged face views of the cams for actuating respectively the looper-carrier and loop-detainer carrier.

As in my said pending application, the frame of the machine is constructed with the hollow rectangular base 1 with bed-plate 2 from the rear end of which rises the hollow standard 3 of the bracket-arm having the forwardly extending member 4 with hollow head 5. The bed-plate 2 supports the usual traveling work-clamp to which longitudinal feeding and sidewise shifting movements are imparted for spacing the overseaming stitches of a buttonhole. The main or driving shaft 6 is mounted in and longitudinally of the base 1 and is provided with quartering cranks 7 connected by means of pitmen 8 with similar cranks 9 of the upper or needle-driving shaft 10 journaled in the bracket-arm member 4. The main-shaft 6 is provided upon its rearward end with the grooved belt-wheel 11 which is in practice adapted to be thrown into and out of driving relation therewith by means of an automatically actuated clutch device.

The tubular needle-bar 12 is suitably journaled in the bracket-arm head 5 and is adapted to reciprocate in the rotary bearing sleeve or bushing 13 with which it is connected to rotate by means of the spline 12ˣ. The bearing sleeve carries beneath the head 5 a block 14 to which is secured the depending guide-plate 15 having parallel slots or runways 16 connected at the upper ends and separated by the tongue 17. To the threaded lower end of the needle-bar is secured the clamp-supporting yoke 18 carrying bearing screws 19 for the lateral boss 20 of the needle-clamp 21 carrying the eye-pointed needle 22 and provided with the arm 23 having the lateral pin 24 and moving alternately in the parallel slots 16 of the guide-plate 15.

The loose collar 25, confined from endwise movement upon the needle-bar, has a lateral stud embraced by the lower end of the pitman 26 embracing at its upper end the stud-pin 27 of the crank-plate 28 fixed upon the forward end of the shaft 29 journaled within the bracket-arm above the axis of the shaft 10 and having upon its rearward end the disk 30 with a series of circularly arranged lateral studs 31. The shaft 10 carries at its forward end the disk 32 having in its forward face a plurality of intersecting diametrical grooves 33 entered by the studs 31 and forming therewith a trammel device, which through the described connections, imparts two complete vertical reciprocations to the needle-bar for each rotation of the needle-actuating shaft and the main-shaft.

The outer end of the pin 24 is embraced by the forked arm 34 of the rocking yoke 35 pivotally mounted upon the block 14 and provided with a lateral arm 36 which is connected at one end of the link 37 attached at the opposite end to the loose sleeve 38 slidingly mounted upon and adapted to rotate with the needle-bar and provided with an annular groove 39 entered by pins 40 carried by the forked end 41 of a lever 42 mounted upon the fulcrum-pin 43 which is journaled upon the bracket-arm head. One of the members of the fork 41 is pivotally connected with the lower end of a link 44 whose upper end has an adjustable pivotal connection with the slotted crank-arm 45 fixed upon the forward end of the rock-shaft 46 carrying at its rearward end a second crank-arm 47 forked to embrace the actuating eccentric 48 upon the needle-actuating shaft 10. By the connections just described, the actuating cam or eccentric 48 upon the shaft 10 imparts to the needle-clamp and needle a lateral reciprocation for each two vertical reciprocations of the needle.

To a transverse brace member 1˟ near the forward end of the base 1 is secured by screws 49 the foot-plate 50 carrying a boss 51 in which is journaled the tubular shank 52 of the rotary looper-support 53 provided with the bearing hubs 54 for the transverse fulcrum-pin 55 upon which is mounted the hub 56 of the looper-carrier with oppositely extending arms 57 and 58 to which are rigidly secured respectively the eyed looper 59 and the forked looper 60.

The looper 59 is provided adjacent its point with a thread-eye 61 extending from the upper to the lower face, and the non-threaded looper 60 has a lateral spur 62 forming with the loop-entering point 63 thereof a lateral notch 64 to receive one limb of the needle-thread loops seized by said looper. Overlying the blade of the non-threaded looper 60 and fulcrumed upon the looper-carrier by means of the stud-screw 65 is the loop-spreader 66 formed with a point 67 normally overlying the point 63 of the forked looper and having an oppositely extending lateral spur 68 forming a notch 69 to receive the other limb of the needle-thread loop. The loop-spreader is yieldingly mounted in normal relation with the looper 60 with its point 67 overlying the point 63 of the looper, by means of a spring 70 having one end secured by the screw 71 to the carrier-arm 58 and its opposite end entering an aperture 72 in the cam-shaped hub 73 of the spreader which is adapted to engage the operative portion 74 of the cam-block 75 secured by means of the fastening screw 76 upon a suitable adjustable seat 58˟ secured upon a laterally extending segmentally slotted arm 53˟ of the looper-support by means of the screw 76˟. The parts are so arranged that upon the rocking of the looper-carrier the overlying members 67 and 63 of the spreader and looper enter the needle-thread loop which engages the spurs 68 and 62 of said members, after which the further movement of the carrier with said members causes the hub 73 of the spreader to engage the cam-member 74, whereby the loop is distended for passage of the needle in a succeeding descent.

The looper-support is provided also with the alined bearing hubs 77 to receive the fulcrum-pin 78, disposed transversely of the looper-carrier fulcrum-pin 55, upon which is mounted the oscillatory sleeve 79 of the carrier for the loop-detainer which is formed with an upwardly extending arm 80 affording a seat to which is fitted the channel 81 formed in one face of the foot 82 of the shank 83 provided with the laterally offset forked loop-detaining member 84. The operative portion of the loop-detaining member is formed with the forwardly and divergently extending jaws 85 and 86 with intermediate throat 87, and rearward of the throat is provided upon the side toward the threaded looper 59 with a lateral notch 88 to afford clearance for the point of the needle so as to insure the entrance of the same between the loop-detainer and the limb of the looper-thread loop leading from the thread-detainer throat to the work.

The sleeve 79 has rigidly connected therewith a lateral arm 89 carrying a laterally extending pin 90 preferably provided with a roller 91 entering the transverse guideway 92 formed in a laterally offset lug 93 at the upper end of the tubular actuating rod 94 having an annular notch or neck 95 at the lower end. The bore of the rod 94 affords a conduit through which the looper-thread is led upwardly from the source of supply and laterally out of the opening 94˟ adjacent the lug 93. Within the tubular shank 52 of the looper-support 53, and upon the exterior of the tubular actuating rod 94 is fitted a second tubular actuating rod 96 having at its lower end an annular notch or neck 97 and provided at the upper end with an offset lug 98 connected by means of the screw-stud 99 with one end of a short link 100 having its outer end connected by means of the screw-stud 101 with the arm 57 of the looper-carrier. The upper end of the tubular rod or tube 96 is suitably cut away to receive the lug 93 of the rod 94.

Mounted upon the forward end of the main-shaft 6 and within a suitable recess in the face of the base member 1˟ is a cam-wheel 102 provided in its outer and inner faces, respectively, with cam-grooves 103 and 104. Mounted within a suitable vertical guideway 105 of the base member 1˟ is the slide-plate 106 having a forwardly projecting forked lug 107 entering the annular notch 97 of the tubular rod 96 and carrying the rearwardly extending roller-stud 108 passing through a slot 109 in the intermediate shield-plate 110 and entering the cam-groove 103 of the wheel 102. Fitted to a seat 111 provided in the base member 1˟ is a second slide-plate 112 formed with a slot 113 embracing the shaft 6 and having an outwardly extending member 114 which is forked to embrace the necked lower end portion 95 of the hollow loop-detainer actuating rod 94, the slide-plate 112 carrying a forwardly projecting roller-stud 115 which enters the cam-groove 104 of the wheel 102. By the means just described, the hollow rods 94 and 96 receive independently from the cam-wheel 102 vertical jogging movements which communicate to the thread-carrier and non-thread-carrying loopers, the loop-spreader and the loop-detainer, their described respective operative movements.

The looper-carrier shank or stem 52 has fixed thereon the toothed pinion 116 with which meshes the lateral rack teeth 117 at the forward end of the reciprocating bar 118; and the lower needle-bar bushing 13 is similarly provided with a toothed pinion 119 engaged by the lateral rack-teeth 120 at the forward extremity of the rack-bar 121 connected by means of the rigid arm 122 with the reciprocating bar 123. The bars 118 and 123 are journaled for endwise movement in suitable bearings of the machine frame, and are rigidly connected together at the rearward ends by means of the brace bar 124 having at its lower end a forwardly extending member 125 carrying an upwardly extending roller-stud 126 which enters a cam-groove 127 in the lower face of the feed-wheel 128 from which the bars 118 and 123 derive their to-and-fro movements to impart the turning movements of the stitch-forming mechanism at the completion of each side-stitching movement of the work-clamp under the action of the feeding mechanism.

The feed-wheel 128 derives its step-by-step operative movements from the clutch-dog 129 through connections with a vibrating lever 130 carrying a roller-stud 131 entering a cam-groove 132 of the cam-cylinder 133 fixed upon the main-shaft 6, as more fully shown and described in my said pending application.

Figure 1:
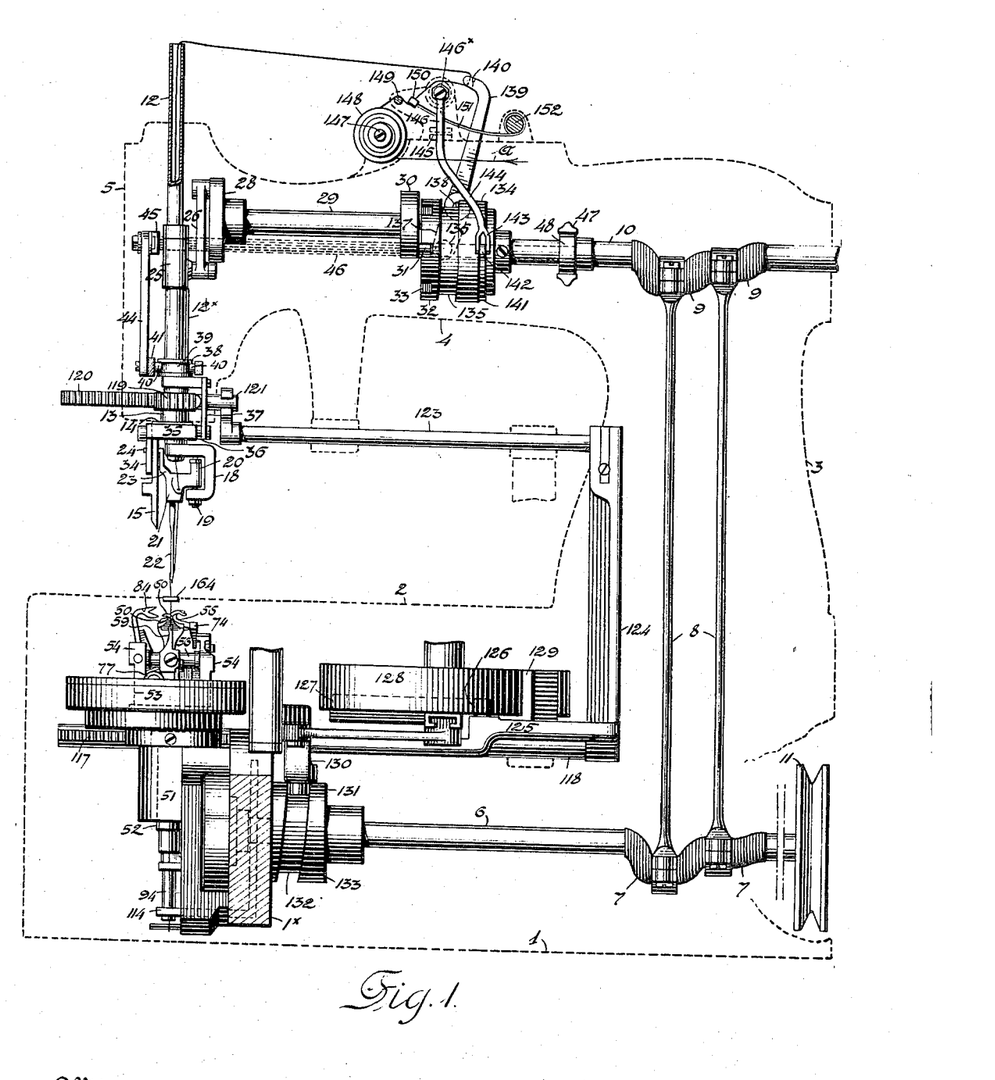
Figure 1 is a side elevation and Fig. 2 an end elevation representing the stitch-forming mechanism of a buttonhole sewing machine constructed substantially in accordance with that forming the subject of my said pending application Serial No. 535,340, with the frame of the machine represented in dotted lines and with most of the parts not related directly with the stitch-forming mechanism omitted.

As shown in Fig. 1, the needle-actuating shaft 10 carries adjacent the grooved disk 32 a cam-cylinder 134 provided with a take-up cam groove 135 entered by a stud 136 upon the depending arm 137 of the take-up lever fulcrumed at 138 and provided with the upwardly extending arm 139 formed with the thread-aperture 140. The cam-cylinder 134 is provided with a second peripheral cam-path 141 traversed by a roller 142 journaled in the forked lower end 143 of the depending arm 144 of a nipper-lever fulcrumed at 145 and having an upwardly extending arm 146 provided with thread-nipping means 146$^x$, as set forth more fully in connection with my said pending application.

In threading the machine, the needle-thread $a$ is led from the source of supply beneath and around the tension pin 147 and between the tension disks 148 thereon over a guide-pin 149 and through a guide-eye 150 upon the controller-spring 151 carried by the stud 152, and thence through the thread-nipping device 146$^x$ and through the aperture 140 of the take-up arm 139 into the upper end of the hollow needle-bar 12 through which it is led downwardly and through the guide-aperture 153 of the needle-clamp 21 to the eye of the needle.

The looper-thread $b$ is led from the source of supply through the guide-eye 154 around the stud-pin 155 and between the tension disks 156, and thence through the guide-eye 157 of the controller spring 158 secured upon the foot-plate 50, by means of the screw 159, into the lower end of the thread-detainer actuating rod 94 through which it passes and emerges from the aperture 94$^x$ at the upper end, from which it is led through the thread-guide 160 upon the carrier-arm 57 to the looper-eye 61. The looper-thread controller 158 is limited in its range of outward movement by the stop-pin 161 having the shank 162 adjustably secured upon the foot-plate 50 by means of the screw 163.

The operation of the stitching mechanism is as follows, assuming the thread-handling parts to be in the positions which they occupy when the machine is started to stitch a buttonhole, but after the initial side stitches have already been formed.

Figure 12:
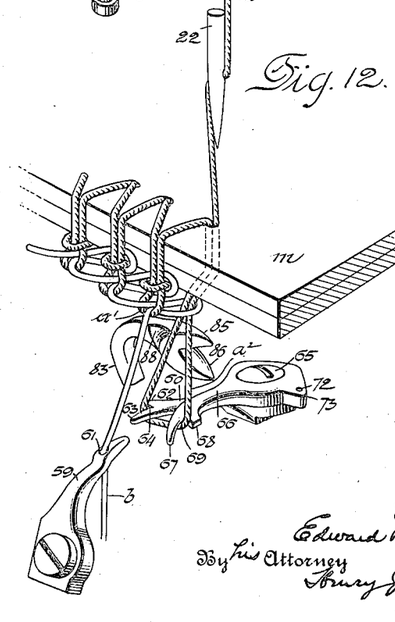

In the initial positions of the parts preparatory to performing an overseam-stitch forming cycle, the needle is raised nearly to extreme position above the needle-throat 164, which is in practice carried by the circularly movable looper-support, after the depth-stitch puncture of the previous stitch of which the secondary or depth-stitch needle-thread loop $a^2$ is held distended by the looper 60 and spreader 66 and the looper 59 is retracted from the cut edge of the material $m$ with the looper-thread $b$ leading from the eye 61 to the purl of the previous stitch, as represented in Fig. 12. At this time, the thread-nipper 146$^x$ is open, and the take-up is between middle and extreme retracted positions.

Figure 13:
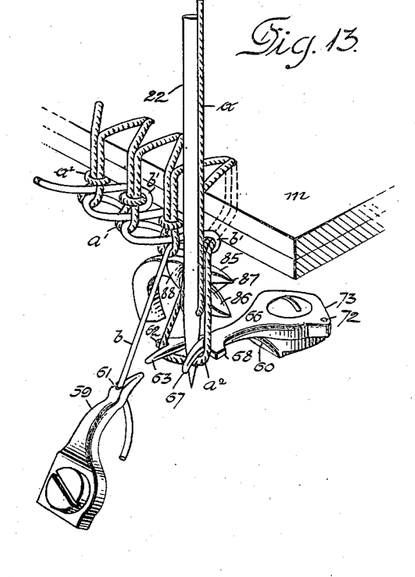

As the needle descends over the edge of the work and its point enters the secondary loop $a^2$ as represented in Fig. 13, the non-threaded looper and spreader retreat, and as the thread-loop $a^2$ is dropped by the latter, the thread-nipper 146$^x$ closes and the take-up 139 performs the first stage of its thread-drawing movement, moving to extreme retracted position, thus setting the previous stitch as the needle reaches its lowest position.

Figure 14:
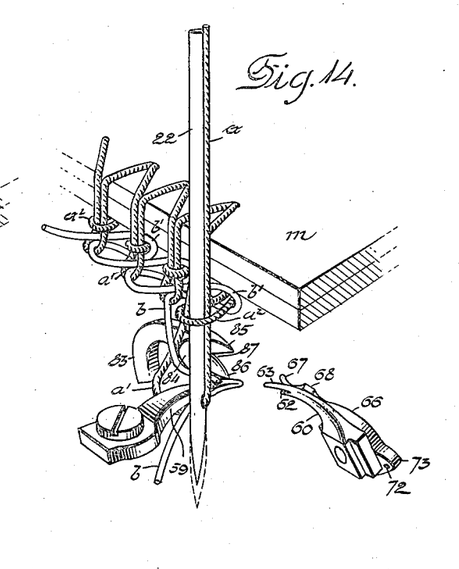

The needle having begun its ascent to throw out a new primary loop $a'$ while the thread-nipper remains closed to prevent the action of the spring-controller arm 151 upon the thread, the point of the thread-carrying looper 59 advances through such needle-loop, as shown in Fig. 14, immediately after which the nipper 146$^x$ opens and the take-up advances to initial position to permit the distention of the thread-loop $a'$; the looper 59 continuing its advance to extreme forward position while the needle rises.

Figure 15:
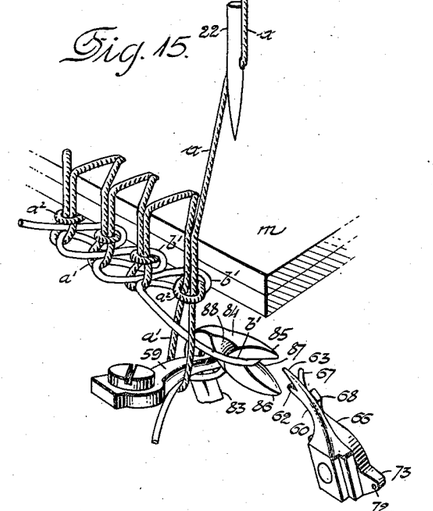

The loop-detainer 84 thereupon advances and engages the looper-thread leading from the looper-eye 61 to the purl or interlock of the previous stitch, thus forming a loop $b'$ of the looper-thread, as represented in Fig. 15, which it detains in the path of the needle in its succeeding depth thrust, while the looper 59 immediately retreats from the primary needle-thread loop $a'$.

Figures 3, 4, 16:
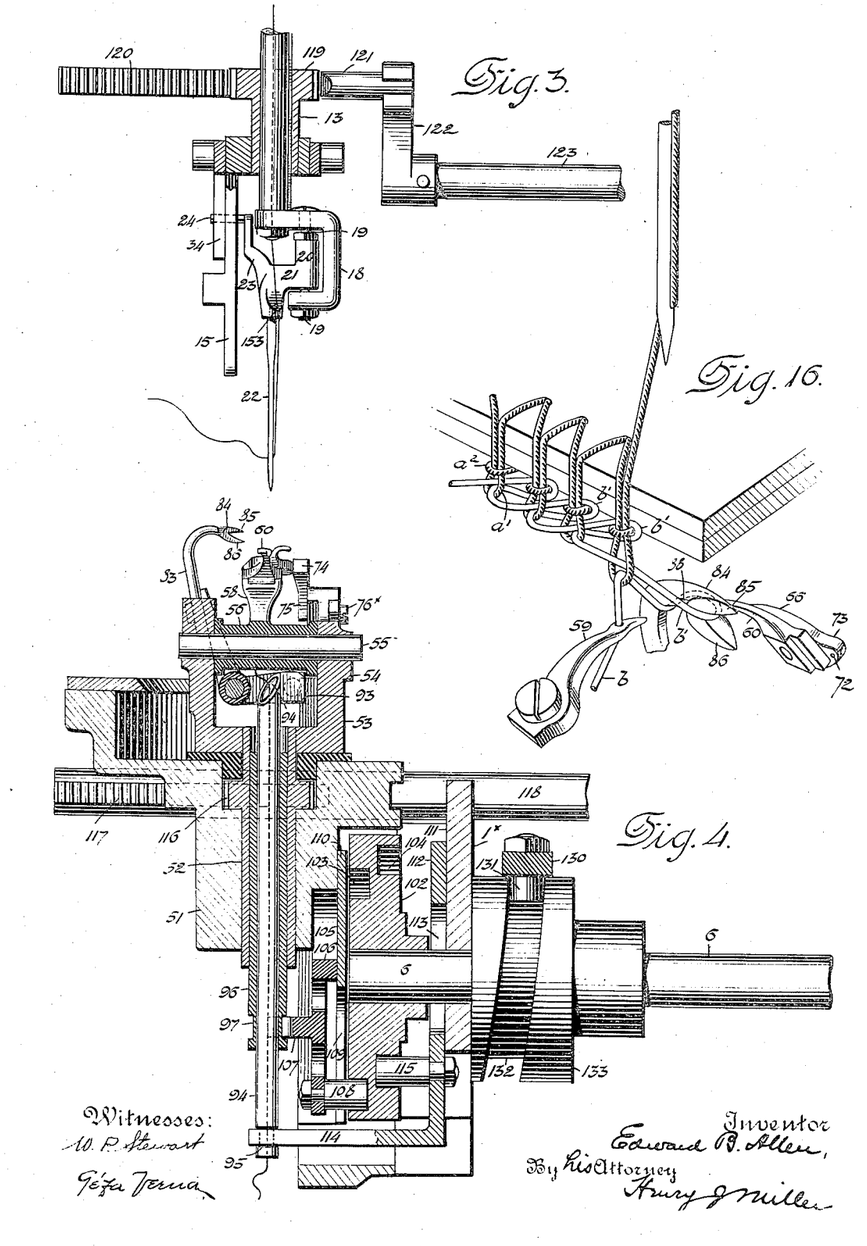
Figs. 3 and 4 are enlarged sectional elevations showing respectively the needle-jogging and turning devices and loop-detainer actuating mechanism.
Figs. 12 to 19 inclusive are perspective views showing diagrammatically upon an enlarged scale various stages of operation of the loop-handling members of the stitch-forming mechanism.
Figure 5:
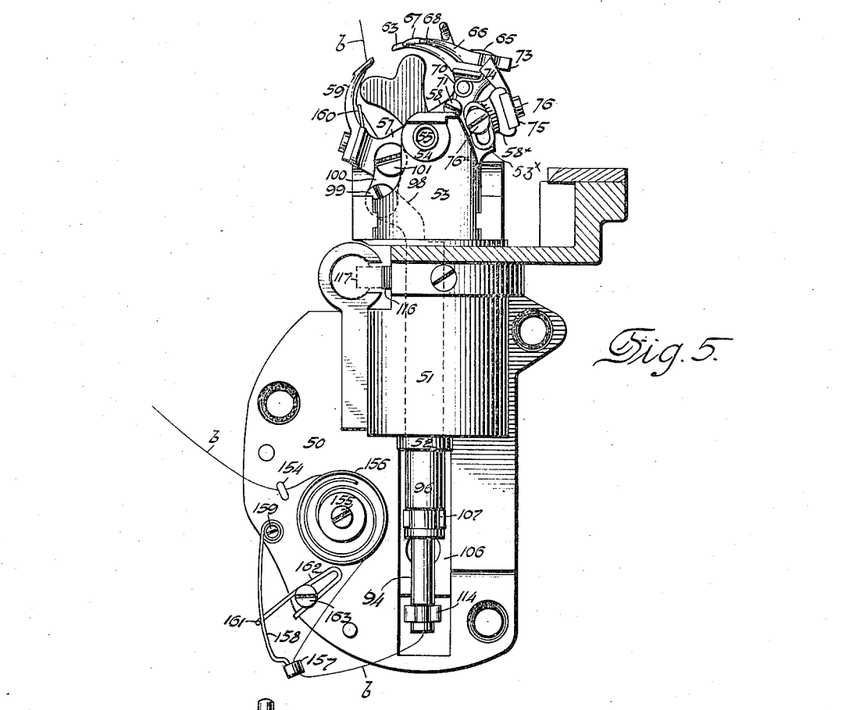
Fig. 5 is a front elevation of the looper mechanism and the bracket upon which it is mounted, and Fig. 6 a plan of the same.
Figure 6:
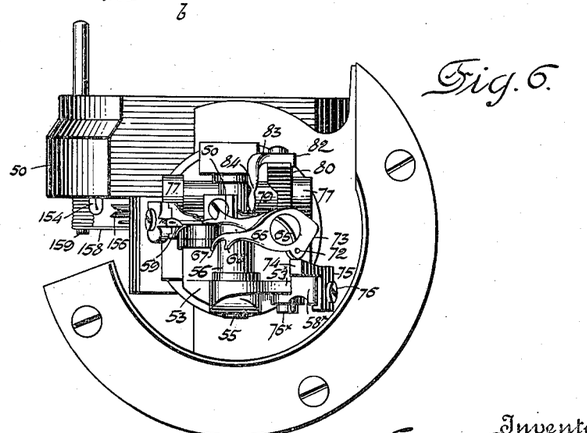
Figure 7:
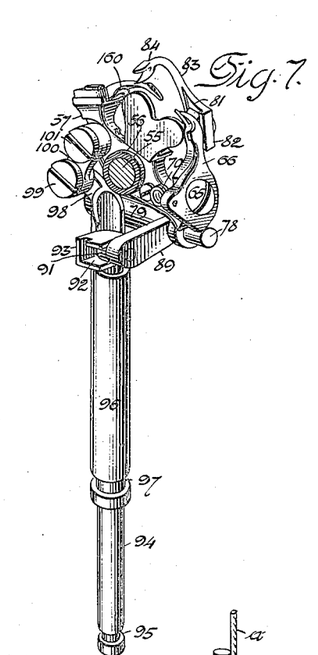
Fig. 7 is a perspective view of the looper mechanism detached from the machine, Fig. 8 a similar view of the loop-detainer and its carrier, and Fig. 9 a perspective view of the tubular actuating rod for the loop-detainer carrier.
Figure 8:
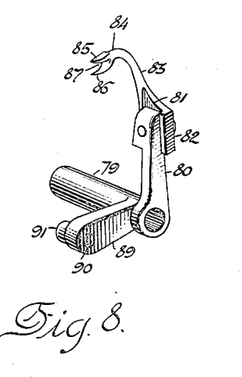
Figure 9:
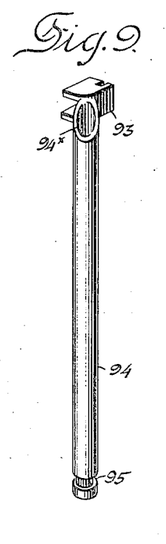

Upon the disengagement of the needle-thread loop $a'$ by the point of the retreating looper 59, and as the needle 22 approaches its highest position, the thread-controller 151 is permitted to act to partially draw up the primary thread-loop $a'$ above the needle-loop presenting position, as represented in Fig. 16, the thread-nipper $146^x$ still remaining open.

Figure 17:
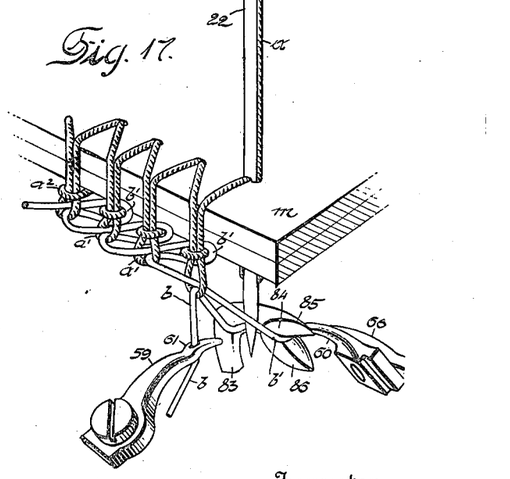

The needle thereupon makes its second descent for the depth-stitch while the thread-controller 151 retains the needle-thread taut to prevent the catching of the thread upon the needle point, which latter enters the distended looper-thread loop $b'$, as represented in Fig. 17, the take-up advancing to give up slack just before the needle-eye enters the material so as to avoid the drawing of extra thread through the tension and to prevent the breaking of the thread by jamming between the wall of the needle puncture in the material and the ungrooved side of the needle.

Figure 18:
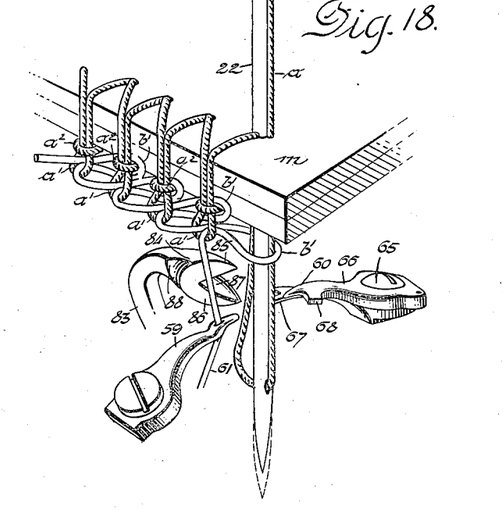

The loop-detainer then retires, dropping its loop $b'$ as represented in Fig. 18, and the looper-thread controller-spring 158 then acts to draw the released looper-thread loop taut around the needle. As the needle approaches its lowest position, the nipper again closes to insure the proper formation of the succeeding depth-stitch needle-thread loop while the take-up remains in advance position to provide slack for distention of the thread-loop $a^4$.

Figure 19:
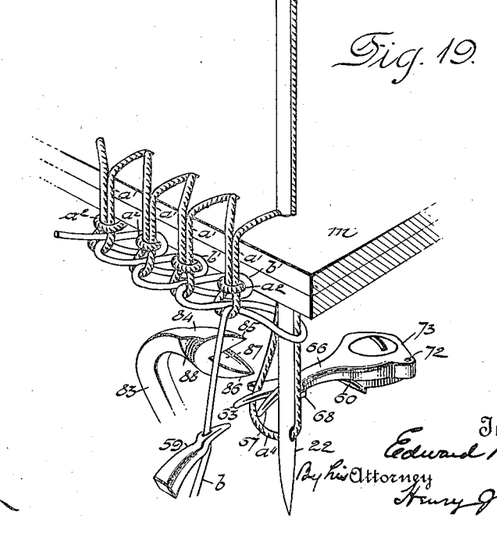

As the needle starts to rise and throws out the new secondary or depth-stitch loop $a^4$, the overlying non-threaded looper 60 and spreader 66 advance and seize the same, as represented in Fig. 19, the continued movement of the looper and spreader to extreme position and the simultaneous rise of the needle to initial position bringing the thread-handling parts again to the position represented in Fig. 12 at the completion of an overseam-stitch forming cycle, while the take-up arm 139 simultaneously recedes to its initial position, for drawing the previously formed primary or edge stitch needle-thread loop $a'$ and thus setting the edge stitch.

From the foregoing description, it will be observed that the present improvement is particularly adapted for overedge stitching, as in overseaming the sides and eyelet ends of buttonholes, as it obviates the skipping of stitches which heretofore has resulted from the detention of the previous loop beneath the work to interfere with the proper presentation of the subsequent loop for seizure by the looper. Thus, upon the release of the primary or edge-stitch needle-thread loop by the thread-carrying looper 59, as represented in Fig. 16, the thread-controller 151 is permitted to act while the needle is raised, so that the needle-thread is drawn in almost a direct line along the needle-blade, through the needle-eye, and over the edge of the fabric or buttonhole slit to pull up the edge-stitch loop above the loop-presenting position of the needle upon its next descent. In the position of the thread-handling members at the time when the secondary or depth-stitch needle-thread loop is released, substantially at the stage of operation represented in Fig. 13, the needle-eye is beneath the work but over the edge of the material, or in the buttonhole slit, and while the needle-thread acted upon by the controller 151 is consequently subjected to a somewhat greater resistance than in the loop-drawing action before described, it will be observed that even at such time the controller-spring 151 is enabled to act effectively in drawing the thread through the needle-eye upwardly through the slit and over the face of the material and through the previously formed needle-puncture, which latter does not embrace the thread sufficiently closely to offer any considerable resistance. It will thus be seen that the action of the controller-spring 151 takes place upon one stitch while the needle is raised, and therefore draws up the needle-thread directly over the edge of the fabric or through the buttonhole slit; and upon the other stitch also over the edge of the fabric or through the slit and through the previous depth-stitch needle-puncture as well. In either case, however, the controller-spring is not required to exert its pull upon the needle-thread in drawing up a previously formed thread-loop while the thread leading thereto is within a needle-puncture occupied by the blade of the needle, so as to be subjected to the lateral pressure of the needle and the wall of the puncture upon the opposite sides of the thread.

As herein shown and described, the stitch-forming mechanism comprises, in conjunction with the loop-detainer, a jogging needle, an eye-pointed looper, and a forked looper with its spreader for enchaining two loops of upper or needle-thread with a loop of lower or looper-thread in the performance of each overseam-stitch forming cycle, but it is evident that the present improvement is adapted to other forms of stitch-forming mechanism in which one thread-carrying implement enters and emerges from the same side of a thread-loop carried through the work by another thread-carrying implement, and that it is therefore adapted to other types of stitch-forming mechanism than that specifically disclosed herein.

The upper-thread take-up and nipping devices represented in Fig. 1 of the accompanying drawings are substantially the same as those shown and described more fully in my said pending application Ser. No. 535,340, but as their specific construction is not an essential part of the present improvement, certain details, particularly of the thread-nipper, are omitted in the present drawings. The needle-thread controller 151 of the present improvement is similar to the corresponding element of the machine represented in said pending application, but differs therefrom in having a greater range of action for coöperation with the present looper mechanism.

Figures 2, 10, 11:
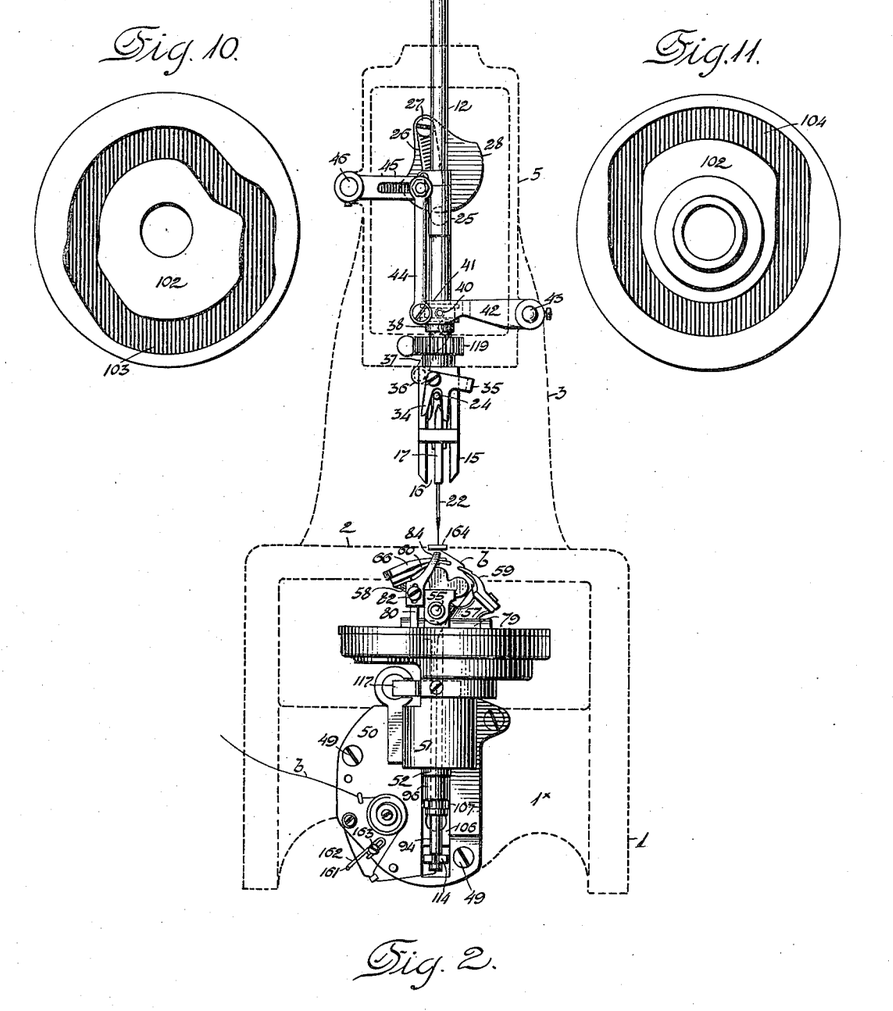

As indicated in Figs. 2, 12 and 13, in the retracted positions of the thread-carrying looper 59 preparatory to the setting of the stitches, the lead of the looper-thread is across and upon the opposite side of the buttonhole slit or edge of the material in relation to the needle paths, so that, not only does the pull of the looper-thread under the action of the looper-thread controller 158 tend to draw the purl or interlock beyond the lower edge of the material, but the pull of the needle-thread a in drawing up and setting the edge-stitch loop takes place beyond the edge of the material. The depth-stitch loop is consequently drawn beyond the lower edge of the material so as to bring the purl in its final position to and partially beyond the edge, and thus the purls at opposite sides of a buttonhole slit will rest substantially in contact and thereby produce a handsome appearance to the work; which is a result long sought but heretofore never attained in a satisfactory manner.

One of the chief factors in this result is the relation in the present mechanism of the threaded and non-threaded loopers to the jogging needle, which is such that the threaded looper enters the needle-thread loop presented by the needle in its overedge thrust, while the non-threaded looper engages the thread-loop presented by the needle in its depth-thrust.

With the class of looper mechanism shown in my said pending application Serial No. 535,340, and represented more fully in Figs. 18 to 22 inclusive of my Patent No. 734,794, of July 28, 1903, difficulty was experienced in producing an overseam as narrow as desired by the trade, as the minimum lateral throw of the needle was limited by the width of the operative portion of the forked looper-thread spreader. In this previous construction, the needle descends to present its loop for passage of the threaded looper and its overlying forked spreader which immediately distends the loop for the succeeding descent of the needle intermediate the looper and spreader, but in a different path nearer the non-threaded looper. As the needle point enters the distended looper-thread loop, the looper and its spreader recede, but the spreader operating means, in order to properly move the spreader in the previous stages of its cycle of operations is incapable, from the nature of the mechanism, of detaining the spreader in its return lateral movement sufficiently to avoid interference with the needle when making a very small lateral jogging movement.

According to the present improvement, the spreader for the looper-thread mounted upon the carrier is dispensed with, and the loop-detainer which retains the looper-thread loop for the succeeding descent of the needle has a path of movement which does not at any time cross that of the needle, and therefore this difficulty is entirely avoided, and the range of movement of the needle for a minimum jog is unlimited by any member of the looper mechanism.

Having thus set forth the nature of the invention, what I claim herein is:—

1. Overseaming sewing mechanism comprising the combination with means operating successively in each stitch-forming cycle to pass primary and secondary thread-loops respectively through the work in different paths, of a looper adapted to pass a looper-thread loop through a primary thread-loop and exterior to the secondary thread-loop of the same cycle, a loop-detainer adapted to engage and hold said looper-thread loop upon the side of the work adjacent the looper for passage of a secondary thread-loop while the looper recedes from the primary thread-loop, means acting after the recession of the looper from the primary thread-loop for drawing up said primary thread-loop upon the looper-thread loop embraced thereby while the looper-thread loop is engaged by the loop-detainer, and actuating means for imparting operative movements to the several thread-handling members.

2. In a sewing machine, the combination with means operating successively in each stitch-forming cycle to pass primary and secondary thread-loops respectively through the work in two different substantially parallel paths, of a looper adapted to pass a looper-thread loop through a primary thread-loop and exterior to the secondary thread-loop of the same cycle, a loop-detainer adapted to engage and hold said looper-thread loop upon the side of the work adjacent the looper for passage of the secondary thread-loop while the looper recedes from the primary thread-loop, means acting after the recession of the looper from the primary thread-loop for drawing up the latter upon the looper-thread loop embraced thereby while the looper-thread loop is detained for passage of the secondary thread-loop, and actuating means for imparting operative movements to the several thread-handling members.

3. In a sewing machine, the combination with means operating successively in each stitch-forming cycle to pass primary and secondary thread-loops respectively through the work in two different substantially parallel paths, of an eyed looper adapted to pass a looper-thread loop through a primary thread-loop and exterior to the secondary thread-loop of the same cycle, a loop-detainer movable independently of said looper and adapted to engage and hold said looper-thread loop upon the side of the work adjacent the looper for passage of the secondary thread-loop while the looper recedes from the primary thread-loop, means acting after the recession of the looper from the primary thread-loop for drawing up the latter upon the looper-thread loop embraced thereby while the looper-thread loop is detained for passage of the secondary thread-loop, and actuating means for imparting operative movements to the several thread-handling members.

4. In a sewing machine, the combination with a thread-carrying needle, a needle-bar in which the same is mounted, and a rotary support in which said needle-bar is journaled to reciprocate, of complemental stitch-forming mechanism comprising a reciprocating thread-carrying looper adapted to pass a loop of looper-thread through a loop of needle-thread, a looper-carrier, a rotary support upon which said looper-carrier is mounted to reciprocate, a loop-detainer mounted upon the rotary looper-support independently of said looper-carrier and adapted to engage and hold said looper-thread loop while the looper recedes from the needle-thread loop for passage of a subsequently formed thread-loop, means for imparting turning movements in unison to said rotary supports, and a needle-thread controller adapted to draw up the first-named needle-thread loop after the recession therefrom of said looper and while the looper-thread loop is engaged by said loop-detainer.

5. In a sewing machine, the combination with means for passing primary and secondary thread-loops successively through the work in different paths, of a reciprocating loop-carrier, oppositely directed thread-carrying and non-thread-carrying loopers mounted upon said carrier and adapted to engage respectively said primary and secondary thread-loops, a spreader overlying the non-thread-carrying looper and adapted for lateral movement relatively to the same, a loop-detainer supported independently of said looper-carrier and adapted to engage and hold said looper-thread loop for passage of the secondary thread-loop while the looper recedes from the primary thread-loop, means acting after the recession of the looper from the primary thread-loop for drawing up the latter upon the looper-thread loop while said looper-thread loop is detained for passage of the secondary thread-loop, and actuating means for imparting operative movements to the several thread-handling members.

6. In a sewing machine, the combination with a reciprocating and laterally jogging needle adapted for passing primary and secondary thread-loops successively through the work in different paths, of a reciprocating looper-carrier, oppositely directed thread-carrying and non-thread-carrying loopers mounted upon said carrier and adapted to engage respectively said primary and secondary thread-loops, a spreader overlying the non-thread-carrying looper and adapted for lateral movement relatively to the same, a loop-detainer supported independently of said looper-carrier and adapted to engage and hold said looper-thread loop for passage of the secondary thread-loop while the looper recedes from the primary thread-loop, means acting after the recession of the looper from the primary thread-loop for drawing up the latter upon the looper-thread loop while said looper-thread loop is detained for passage of the secondary thread-loop, and actuating means for imparting operative movements to the several thread-handling members.

7. In a sewing machine, the combination with means for passing primary and secondary thread-loops successively through the work in different paths, of a looper adapted to pass a looper-thread loop through a primary thread-loop, a reciprocating carrier for said looper, a loop-detainer mounted independently of said looper-carrier and adapted to engage and hold said looper-thread loop at one side of the path of the primary thread-loop for passage of the secondary thread-loop while the looper recedes from the primary thread-loop and to retain said looper-thread loop out of the path of movement of the succeeding primary thread-loop, means acting after the recession of the looper from the primary thread-loop for drawing up the latter upon the looper-thread loop while said looper-thread loop is detained for passage of the secondary thread-loop, and actuating means for imparting operative movements to the several thread-handling members.

8. In a sewing machine, the combination with means for passing primary and secondary thread-loops successively through the work in different paths, of a looper adapted to pass a looper-thread loop through a primary thread-loop, a looper-support, an oscillatory looper-carrier upon which said looper is mounted, a fulcrum-pin for said looper-carrier mounted upon the looper-support, an oscillatory loop-detainer adapt- substantially axial relation with the rotary loop after recession therefrom of the thread-carrying looper and while the looper loop is engaged by the loop-detainer, and actuating means for imparting operative movements to the looper-carrier and the loop-detainer.

In testimony whereof, I have signed my name to this specification, in the presence of two subscribing witnesses.

EDWARD B. ALLEN.

Witnesses:
 HENRY J. MILLER,
 HENRY A. KORNEMANN.